US009477932B2

(12) United States Patent
Dam

(10) Patent No.: US 9,477,932 B2
(45) Date of Patent: Oct. 25, 2016

(54) SYSTEM AND METHOD FOR PROVIDING VISUALIZATION OF A PARAMETER ON MULTIPLE BRANCHES OF A DISTRIBUTION NETWORK

(75) Inventor: Quang Binh Dam, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 13/007,731

(22) Filed: Jan. 17, 2011

(65) Prior Publication Data

US 2012/0185804 A1    Jul. 19, 2012

(51) Int. Cl.
*G06F 3/00*      (2006.01)
*G06Q 10/00*    (2012.01)
*G06F 3/01*      (2006.01)

(52) U.S. Cl.
CPC ..................... *G06Q 10/00* (2013.01)

(58) Field of Classification Search
USPC ........... 715/764, 853; 700/286, 297; 702/60, 702/58, 59, 62
See application file for complete search history.

(56) References Cited

U.S. PATENT DOCUMENTS

| 5,675,754 | A | 10/1997 | King et al. |
| 5,745,114 | A | 4/1998 | King et al. |
| 6,038,516 | A | 3/2000 | Alexander et al. |
| 6,225,999 | B1* | 5/2001 | Jain et al. ............... 715/734 |
| 6,289,267 | B1 | 9/2001 | Alexander et al. |
| 6,380,957 | B1* | 4/2002 | Banning ............... 715/828 |
| 6,466,240 | B1* | 10/2002 | Maslov ............... 715/234 |
| 6,819,962 | B1* | 11/2004 | Bailey ............... 700/27 |
| 7,233,333 | B2 | 6/2007 | Lomask |
| 7,242,413 | B2* | 7/2007 | Chu et al. ............... 345/619 |
| 7,292,246 | B2 | 11/2007 | Goldschmidt |
| 7,373,592 | B2* | 5/2008 | Allyn ............... 715/211 |
| 7,437,676 | B1* | 10/2008 | Magdum et al. ............ 715/738 |
| 7,689,938 | B2* | 3/2010 | Kearns et al. ............ 715/854 |
| 8,266,548 | B2* | 9/2012 | Denkel ............... 715/853 |
| 8,560,949 | B2* | 10/2013 | Rissanen ............... 715/711 |
| 9,189,124 | B2* | 11/2015 | Pahlavan ............ G06F 3/0481 |
| 2003/0128212 | A1* | 7/2003 | Pitkow ............... 345/440 |
| 2003/0218641 | A1* | 11/2003 | Longobardi ............... 345/853 |
| 2004/0205638 | A1* | 10/2004 | Thomas et al. ............ 715/526 |
| 2004/0243945 | A1* | 12/2004 | Benhase et al. ............ 715/853 |
| 2005/0071765 | A1* | 3/2005 | Hallisey et al. ............ 715/734 |
| 2005/0132304 | A1* | 6/2005 | Guido et al. ............ 715/853 |
| 2005/0179684 | A1* | 8/2005 | Wallace ............... 345/419 |
| 2006/0080465 | A1* | 4/2006 | Conzola et al. ............ 709/245 |
| 2006/0184539 | A1* | 8/2006 | Blake et al. ............... 707/10 |

(Continued)

FOREIGN PATENT DOCUMENTS

EP     0731359 A2    9/1996
JP     5333848 A    12/1993

*Primary Examiner* — Toan Vu
(74) *Attorney, Agent, or Firm* — Sutherland Asbill & Brennan LLP

(57) ABSTRACT

A method of displaying a representation of a power distribution network and a representation of a parameter of the power distribution network on a display device includes displaying the representation of a power distribution network on the display device as an expandable tree structure in a first region, the expandable tree structure having branches that can be expanded and collapsed; displaying the representation of the parameter on the display device during a time period that the representation of the power distribution network is displayed; and collapsing or expanding a portion of the representation of the parameter when a branch is expanded or collapsed.

20 Claims, 5 Drawing Sheets

(56) References Cited

U.S. PATENT DOCUMENTS

| | | | |
|---|---|---|---|
| 2006/0238364 A1* | 10/2006 | Keefe et al. | 340/646 |
| 2007/0176933 A1 | 8/2007 | Culpi et al. | |
| 2007/0244990 A1 | 10/2007 | Wells | |
| 2008/0016474 A1* | 1/2008 | Guido et al. | 715/854 |
| 2008/0022215 A1* | 1/2008 | Lee | G06F 3/04855 715/762 |
| 2008/0255902 A1* | 10/2008 | Poer et al. | 705/7 |
| 2008/0263469 A1* | 10/2008 | Nasle et al. | 715/771 |
| 2008/0284799 A1 | 11/2008 | Hollemans et al. | |
| 2008/0295014 A1* | 11/2008 | Hennum et al. | 715/771 |
| 2009/0031249 A1* | 1/2009 | Castelli et al. | 715/810 |
| 2009/0089837 A1* | 4/2009 | Momosaki | 725/40 |
| 2009/0125835 A1* | 5/2009 | Vaughan et al. | 715/781 |
| 2009/0157529 A1* | 6/2009 | Ehlers et al. | 705/26 |
| 2009/0164936 A1* | 6/2009 | Kawaguchi | G06F 3/0481 715/788 |
| 2009/0187285 A1* | 7/2009 | Yaney et al. | 700/292 |
| 2009/0199128 A1* | 8/2009 | Matthews | G06F 3/0481 715/799 |
| 2009/0248214 A1* | 10/2009 | Fickey et al. | 700/286 |
| 2009/0319093 A1* | 12/2009 | Joos et al. | 700/297 |
| 2010/0017421 A1* | 1/2010 | Hamada | 707/100 |
| 2010/0106332 A1* | 4/2010 | Chassin et al. | 700/278 |
| 2010/0131885 A1* | 5/2010 | Licato et al. | 715/781 |
| 2010/0299629 A1* | 11/2010 | Faist et al. | 715/801 |
| 2011/0041099 A1* | 2/2011 | Weise et al. | 715/854 |
| 2011/0261057 A1* | 10/2011 | Freyhult et al. | 345/440 |
| 2012/0005045 A1* | 1/2012 | Baker | 705/27.2 |
| 2012/0036091 A1* | 2/2012 | Cook | G06Q 50/06 705/412 |
| 2012/0036464 A1* | 2/2012 | Rissanen | 715/771 |
| 2012/0046891 A1* | 2/2012 | Yaney et al. | 702/62 |
| 2012/0144328 A1* | 6/2012 | O'Byrne | 715/764 |
| 2012/0278015 A1* | 11/2012 | Budhraja et al. | 702/62 |
| 2013/0124990 A1* | 5/2013 | Lettau | G11B 27/34 715/716 |
| 2014/0101552 A1* | 4/2014 | Meaney | G11B 27/034 715/723 |

\* cited by examiner

SYSTEM AND METHOD FOR PROVIDING VISUALIZATION OF A PARAMETER ON MULTIPLE BRANCHES OF A DISTIBUTION NETWORK

BACKGROUND OF THE INVENTION

The subject matter disclosed herein relates to supplying power and, in particular, to providing graphical representations of portions of a power distribution network.

Many manners of power production exist. After the power has been produced, it needs to be distributed. A typical distribution network includes a production facility (feeder) and one or more branches. Each branch may include further branches.

In some instances, an operator of a power distribution network is provided with computer-generated representations (maps) of the power distribution network. These maps provide a graphical representation of some or all of the distribution network. In some of these maps, the user is allowed to select a branch of the network. After the branch is selected, analysis software can generate a graph representing the power factor or the voltage along that branch. Typically, a new graph is recreated if the user decides to view voltages or power factors along a different branch, and users can only view one specific branch per graph.

Utilizing multiple graphs destroys visualization continuity. Furthermore, utilizing graphs such as heat/temperature maps makes it more difficult for the human eye to distinguish small variations of a power distribution network parameter. In addition, it makes it difficult to locate ramifications of feeder changes in the individual branches. Further, the different displays often have different scales making interpretation harder.

BRIEF DESCRIPTION OF THE INVENTION

According to one aspect of the invention, a system for displaying a parameter of a power distribution network is disclosed. The system of this aspect includes a computing device that receives information related to the parameter; and a display coupled to the computing device and displaying information to a user. The display presents a first region and second region and the first region includes a representation of the power distribution network and has branches that can be expanded and collapsed and the second region includes a representation of the parameter that expands when the representation of the power distribution network is expanded.

According to another aspect of the present invention, a method of displaying a representation of a power distribution network and a representation of a parameter of the power distribution network on a display device is disclosed. The method of this aspect includes: displaying the representation of the power distribution network on the display device as an expandable tree structure in a first region, the expandable tree structure having branches that can be expanded and collapsed; displaying the representation of the parameter in a second region of a power distribution network on the display device during a time period that the representation of the power distribution network is displayed; and collapsing a portion of the representation of the distribution network and the parameter when a branch is collapsed.

According to another aspect of the present invention, a method of displaying a representation of a power distribution network and a representation of a parameter of the power distribution network on a display device is disclosed. The method of this aspect includes: displaying the representation of a power distribution network on the display device as an expandable tree structure in a first region, the expandable tree structure having branches that can be expanded and collapsed; displaying the representation of the parameter in a second region on the display device during a time period that the representation of the power distribution network is displayed; and expanding a portion of the representation of the distribution network and the parameter when a branch is expanded.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

According to one embodiment of the present invention, an interactive display that represents a power distribution system is provided in a first display region. In a second display region, a parameter (e.g., voltage or power factor) of the distribution system is shown. The scale of the first and second display regions are the same and aligned on at least one axis. In one embodiment, the two regions are presented in a fixed relationship relative to one another on a display apparatus. According to one embodiment, a user can expand or collapse branches of the representation of the power distribution system displayed in the first region and this causes the corresponding data in the second region to likewise expand or collapse. By showing and hiding branches that are irrelevant, users can compare the behavior of branches with respect to the feeder. Specifically, transitions between common portions and branches are easier to compare. Also, users can quickly locate the ramifications of any feeder operational change.

Figure 1:
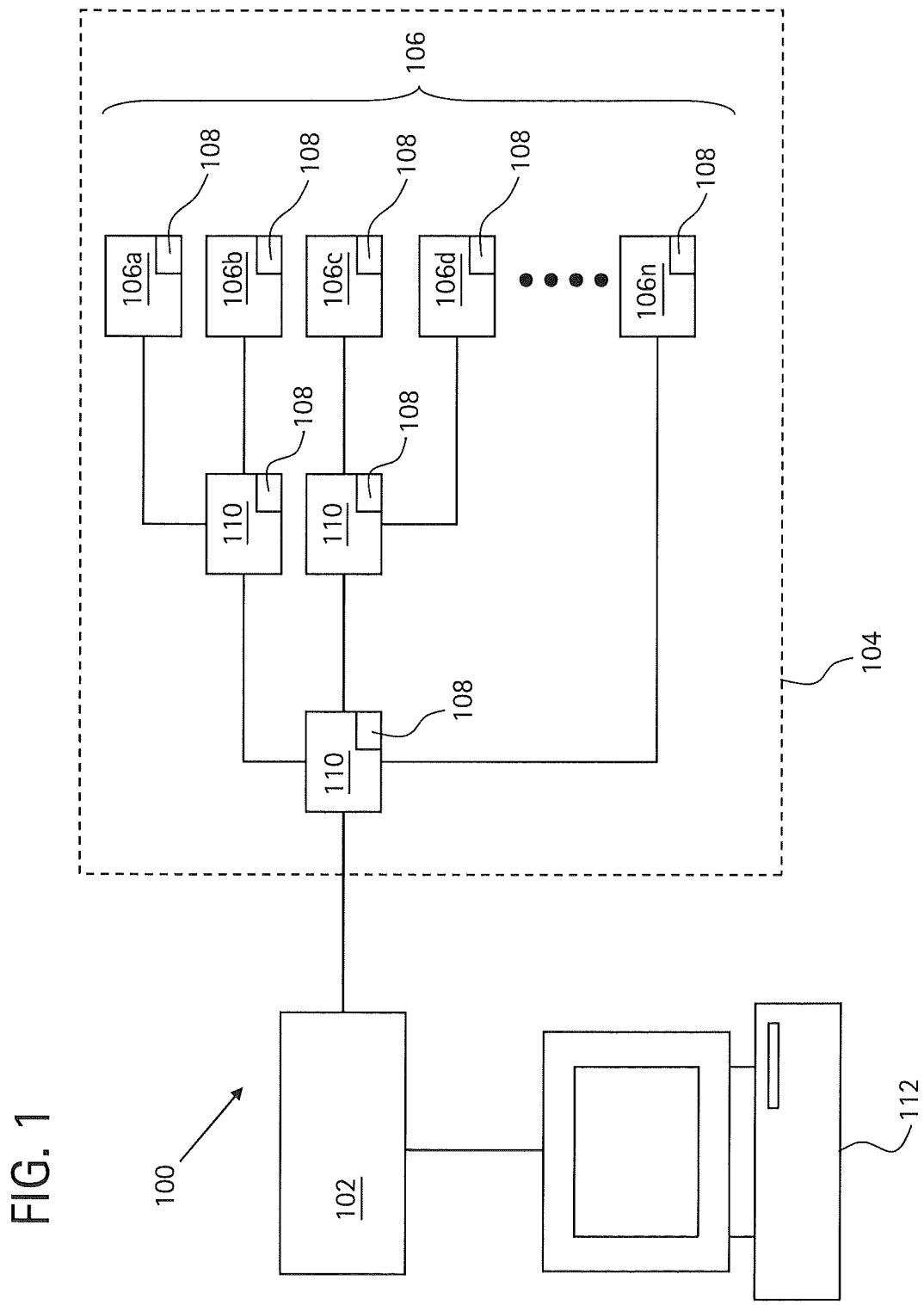
FIG. 1 is a block diagram of a system according to one embodiment of the present invention.

FIG. 1 is a block diagram showing an embodiment of a system 100 according to one embodiment. The system 100 includes a feeder 102. The feeder 102 can be any facility that provides power. For example, the feeder 102 may be a power production facility, a grid substation, a bulk supply, or a primary substation, to name a few.

The feeder 102 provides power to a distribution network 104. The distribution network delivers power received from the feeder to one or more endpoints 106a . . . 106n. The endpoints 106 can be any location that uses power. For example, the endpoints 106 can be homes, businesses, schools, or any other location that consumes power. In one embodiment, each of the endpoints 106 includes a power measurement device 108 such as a power meter. The power measurement device 108 is capable of measuring one or more parameters of the power provided to the endpoint 106 where it is located. For example, the power measurement device 108 may be able to measure one or more of: real power, voltage, current, apparent power, reactive power, power factor, or the like.

The distribution network 104 illustrated in FIG. 1 also includes a plurality of branch locations 110. Each branch location 110 is a location where the distribution network 104 splits. The branch locations can be, for example, a grid substation, a bulk supply, or a primary substation, for example. Some or all of the branch locations 110 also include power measurement devices 108.

The power measurement devices 108 are configured to provide information they record/determine to another location. In one embodiment, this information is provided to the feeder 102. In particular, the information may be provided to a computing device 112 in or in communication with the feeder 102. The computing device 112 is configured, in one embodiment, to display the information in the manner as hereinafter described. For example, the computing device 112 may include specific hardware, software, or a combination thereof that allows it to simultaneously present two different but related graphs to each other. One of the graphs illustrates the distribution network along a first axis with a first scale. The other graph corresponds to the first graph and has an axis that also has the first scale and displays a parameter of the distribution network.

Figure 2:
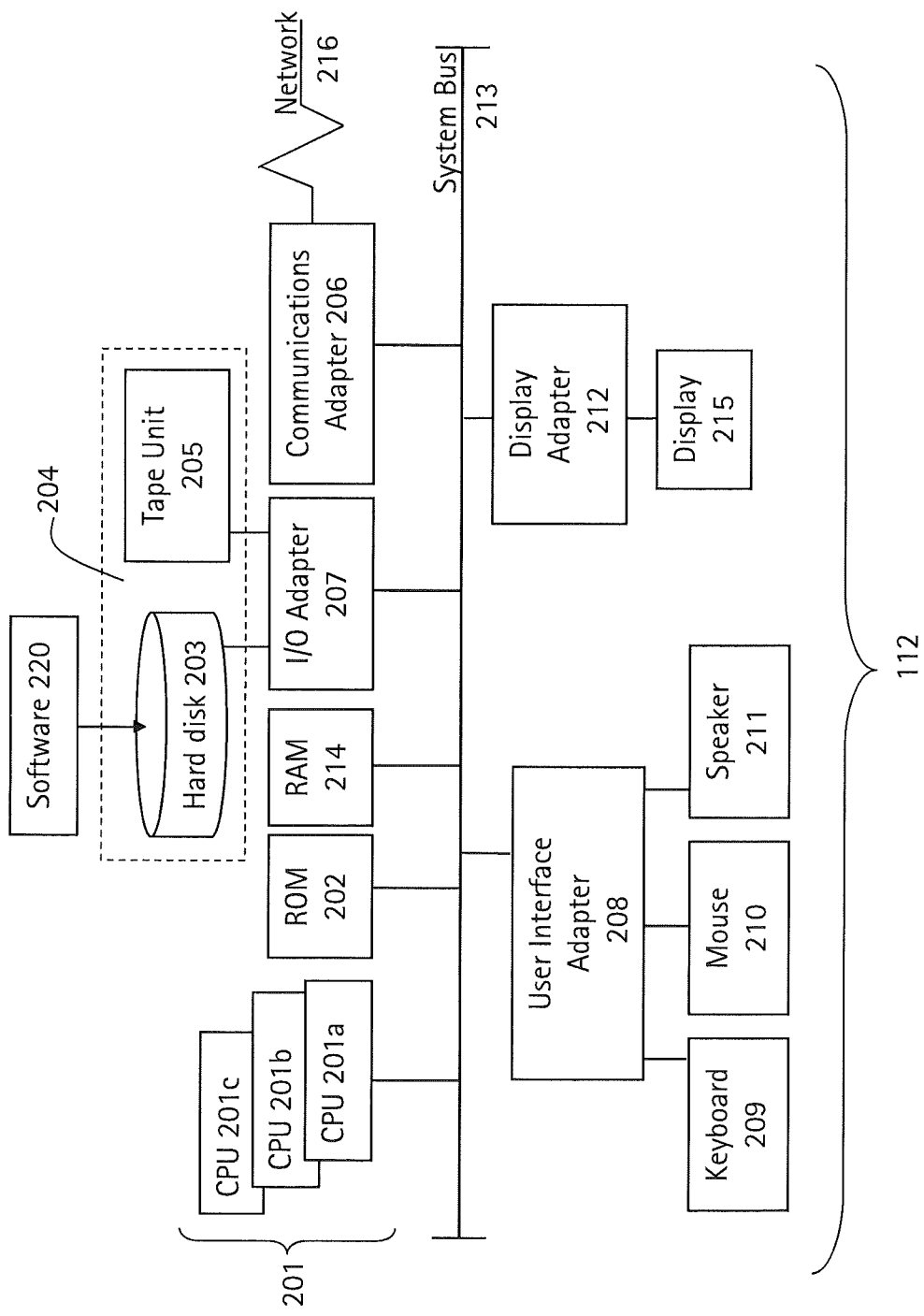
FIG. 2 is a block diagram of a computing device according to another embodiment of the present invention.

FIG. 2 shows an example of a computing device 112 on which embodiments of the present invention may be implemented. In this embodiment, the device has one or more central processing units (processors) 201*a*, 201*b*, 201*c*, etc. (collectively or generically referred to as processor(s) 201). In one embodiment, each processor 201 may include a reduced instruction set computer (RISC) microprocessor. Processors 201 are coupled to system memory (RAM) 214 and various other components via a system bus 213. Read only memory (ROM) 202 is coupled to the system bus 213 and may include a basic input/output system (BIOS), which controls certain basic functions of the computing device 112.

FIG. 2 further depicts an input/output (I/O) adapter 207 and a network adapter (communications adapter) 206 coupled to the system bus 213. The I/O adapter 207 may be a small computer system interface (SCSI) adapter that communicates with a hard disk 203 and/or a tape storage device (tape unit) 205 or any other similar component. The I/O adapter 207, the hard disk 203, and the tape storage device 205 are collectively referred to herein as mass storage 204. A network adapter 206 interconnects the system bus 213 with an outside network 216 enabling the computing device 212 to communicate with other such systems. A screen (e.g., a display monitor) 215 is connected to the system bus 213 by the display adapter 212, which may include a graphics adapter to improve the performance of graphics intensive applications and a video controller. In one embodiment, the adapters 207, 206, and 212 may be connected to one or more I/O buses that are connected to the system bus 213 via an intermediate bus bridge (not shown). Suitable I/O buses for connecting peripheral devices such as hard disk controllers, network adapters, and graphics adapters typically include common protocols, such as the Peripheral Component Interface (PCI). Additional input/output devices are shown as connected to the system bus 213 via the user interface adapter 208 and the display adapter 212. A keyboard 209, a mouse 210, and a speaker 211 are all interconnected to the system bus 213 via the user interface adapter 208, which may include, for example, an I/O chip integrating multiple device adapters into a single integrated circuit.

Thus, as configured in FIG. 1, the computing device 112 includes processing means in the form of processors 201, storage means including system memory (RAM) 214 and mass storage 204, input means such as keyboard 209 and mouse 210, and output means including speaker 211 and display 215. In one embodiment, a portion of the system memory 214 and the mass storage 204 collectively store an operating system to coordinate the functions of the various components shown in FIG. 1.

It will be appreciated that the computing device 112 can be any suitable computer or computing platform, and may include a terminal, wireless device, information appliance, device, workstation, mini-computer, mainframe computer, personal digital assistant (PDA) or other computing device. It shall be understood that the computing device 112 may include multiple computing devices linked together by a communication network. For example, there may exist a client-server relationship between two systems and processing may be split between the two.

Examples of operating systems that may be supported by the system 100 include Windows 95, Windows 98, Windows NT 4.0, Windows XP, Windows 2000, Windows CE, Windows Vista, Mac OS, Java, AIX, LINUX, and UNIX, or any other suitable operating system. As stated above, the computing device 112 also includes a network adapter 206 for communicating over a network 216. The network 216 can be a local-area network (LAN), a metro-area network (MAN), or wide-area network (WAN), such as the Internet or World Wide Web.

Users of the computing device 112 can connect to the network 216 through any suitable network interface connection, such as standard telephone lines, digital subscriber lines, LAN or WAN links (e.g., T1, T3), broadband connections (Frame Relay, ATM), and wireless connections (e.g., 802.11(a), 802.11(b), 802.11(g)).

As disclosed herein, the computing device 112 includes machine-readable instructions stored on machine readable media (for example, the hard disk 203) for capture and interactive display of information shown on the display 215 of a user. In one non-limiting embodiment, machine (computer) readable media is non-transitory. As discussed herein, the instructions are referred to as "software" 220. The software 220 may be produced using software development tools as are known in the art. The software 220 may include various tools and features for providing user interaction capabilities as are known in the art.

In some embodiments, the software 220 is provided as an overlay to another program. For example, the software 220 may be provided as an "add-in" to an application (or operating system). In one embodiment, the add-in is provided to a distribution network simulation system. In such an embodiment, the display according to the present invention displays simulated rather than actual data. Note that the term "add-in" generally refers to supplemental program code as is known in the art. In such embodiments, the software 220 may replace structures or objects of the application or operating system with which it cooperates.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage mediums would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Figure 3:
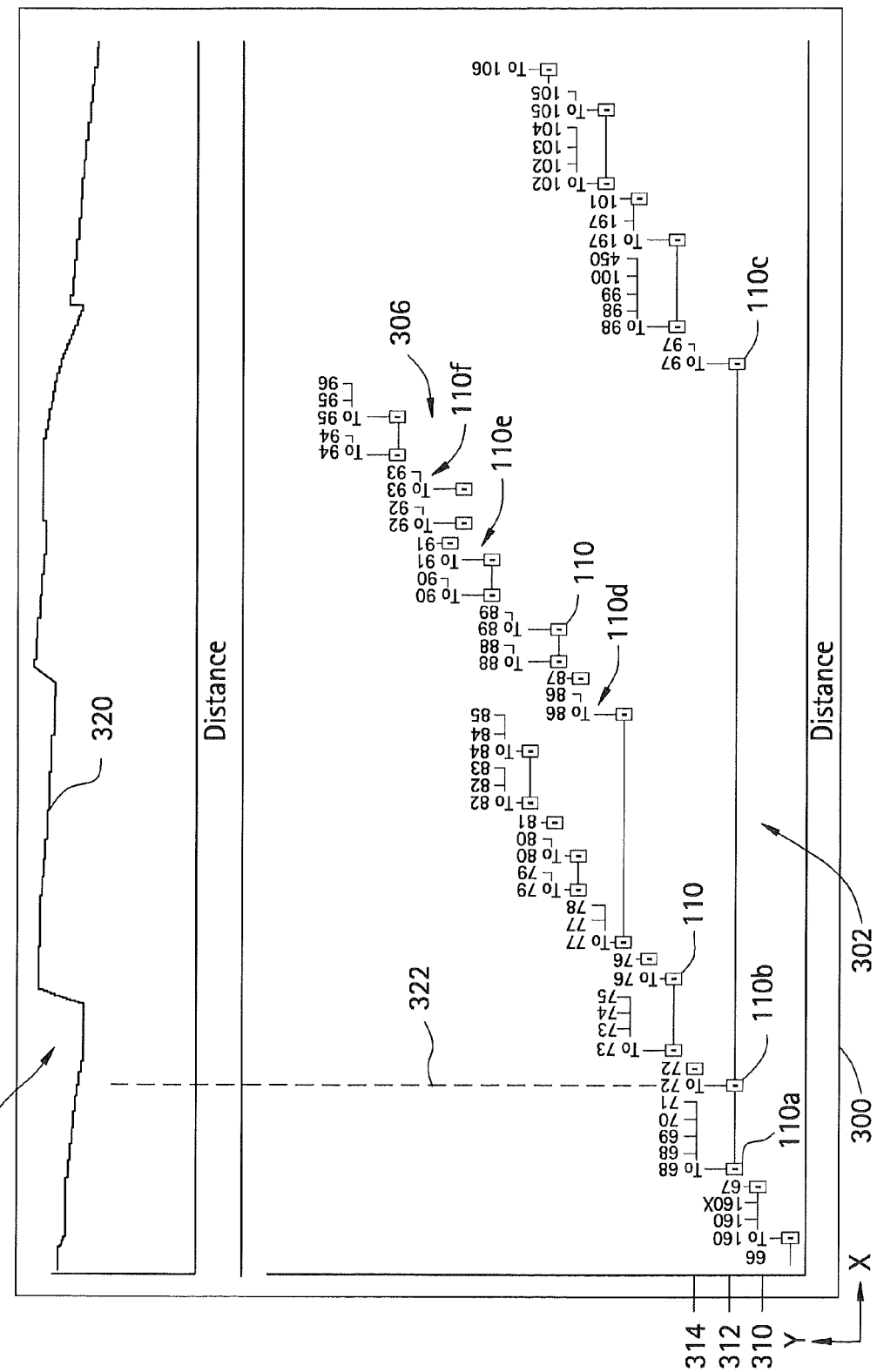
FIG. 3 shows an example of a display according to one embodiment.

FIG. 3 shows an example of a display 300 according to one embodiment of the present invention. The display 300 is provided on, for example, the display 215 shown in FIG. 2 in one embodiment.

The display illustrated in FIG. 3 includes a first region 302 and a second region 304. In the illustrated embodiment, the first region 302 includes a representation 306 of a distribution network. The representation 306 includes representations of the branch location 110 shown in FIG. 1. In FIG. 3, the branch representations are labeled with reference numeral 110 for consistency. In one embodiment, the representation 306 is a tree view representation where each branch is uniquely identifiable by a reference number, code, name, and so on.

The representation 306 is arranged to extend along the x-axis in the illustrated embodiment. Of course, the representation could extend along the y-axis in an alternative embodiment.

The representation includes various levels 310, 312, 314. In one embodiment, the distance from a location increases as one progresses from left to right along the x-axis within a particular level. For example, in level 312, branch 110f is further from branch 110d than branch 110e is. In FIG. 3, an "expanded" branch (i.e., one that can be contracted) is indicated with a "−" symbol and a collapsed branch (i.e., one that can be expanded) is indicated with a "+" symbol. Of course, other symbols could be used for such indications. In operation, branch 110 can be expanded or contracted by selecting the "+" or "−", respectively, displayed therein. The second region includes a trace 320 that shows the value of a parameter (e.g., voltage or power factor) at a certain location of the distribution network that the representation 306 illustrates. For example, and as illustrated by dashed line 322, the value of the parameter at branch 110b is found by following the dashed line 322 from branch 110b to trace 320. For the value to be accurate, the scale along the x-axis of the first region 302 and the scale along the x-axis of the second region 304 are the same and aligned with one another. Of course, as will be seen by one of skill in the art, the scale may vary along the x-axis depending on whether a branch has been expanded or not.

Figure 4:
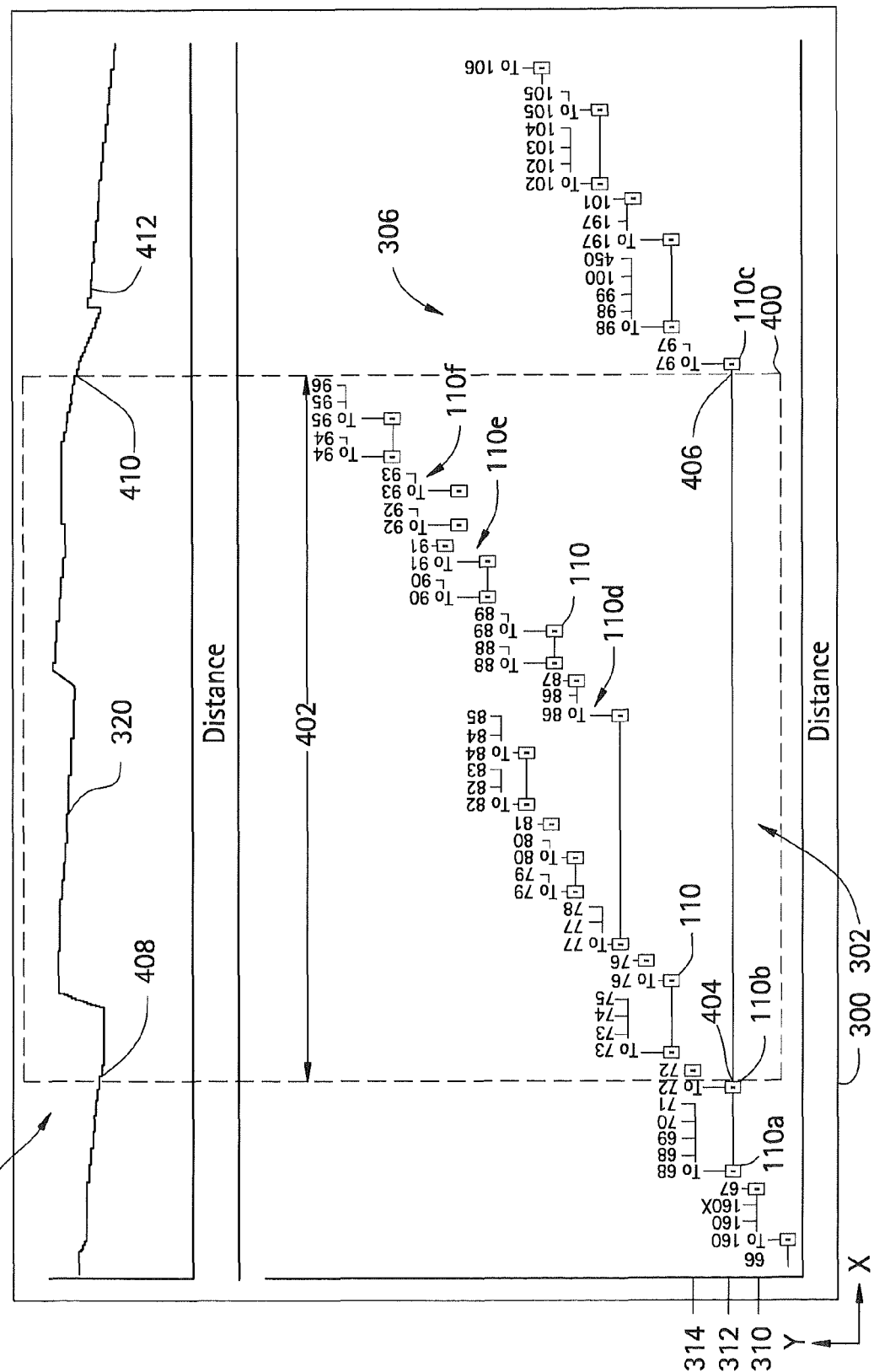
FIG. 4 shows an example of the display of FIG. 3 with a collapse area illustrated on it.
Figure 5:
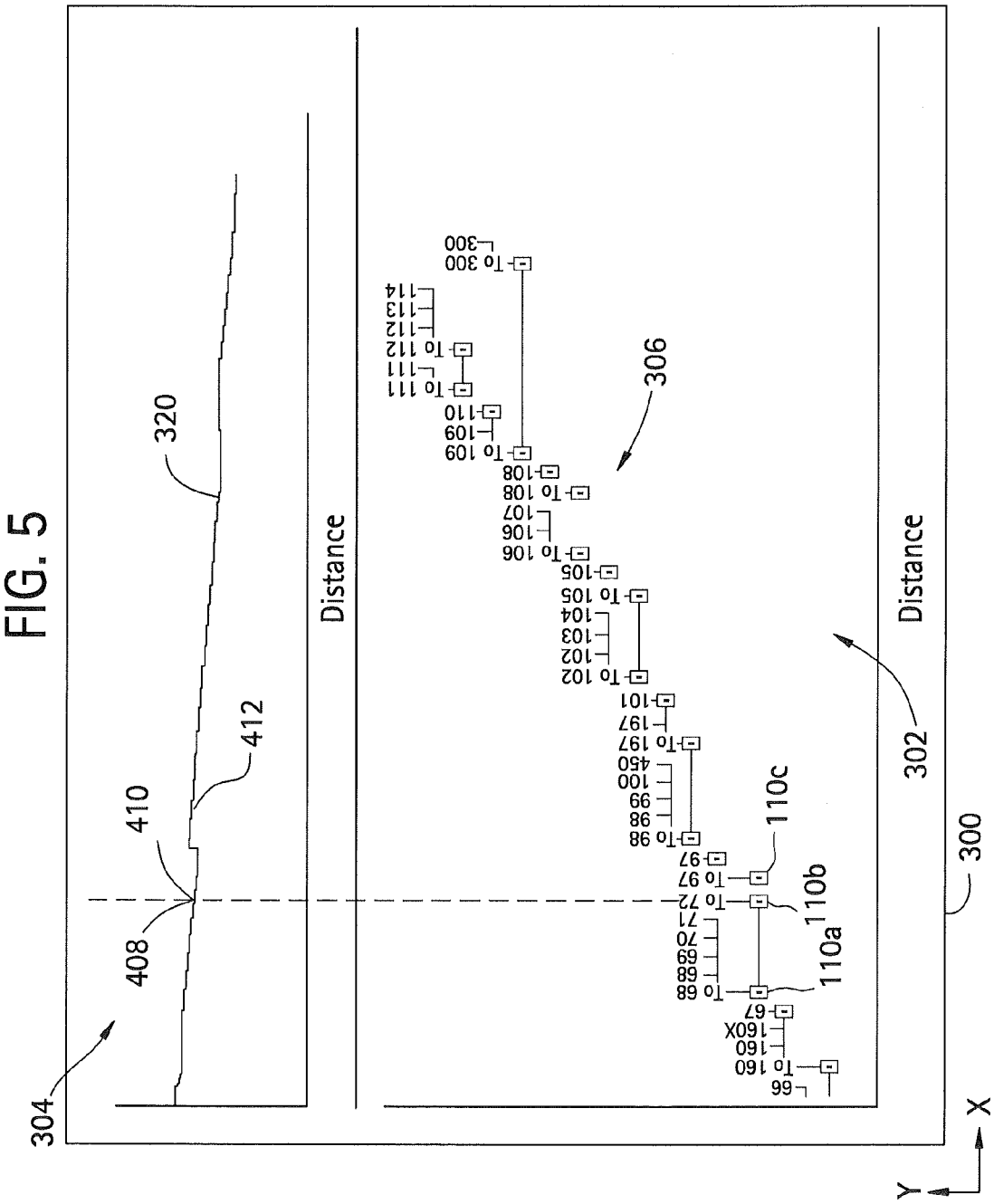
FIG. 5 shows an example of the display shown in FIG. 4 after the collapse area has been collapsed.

FIG. 4 illustrates the screen 300 shown in FIG. 3 with a collapse area 400 superimposed over it. FIG. 5 represents the screen 300 shown in FIG. 4 after branch 110b has been contracted. Reference will now be made to both FIGS. 4 and 5.

The collapse area 400 shows the x-axis extent 402 that will be collapsed if branch 110b is contracted. In the first region 302, the representation 306 intersects with the collapse area 400 at points 404 and 406. As such, when collapsed, points 404 and 406 are brought together and the portions of the representation 306 between them are hidden as shown in FIG. 5. Similarly, points 408 and 410 in the second region 304 are brought together. This illustrates one embodiment of the present invention where a change of view in the first region 302 causes a change of view in the second region 304. In one embodiment, a change of scale in an extent of the first region 302 causes the same change of scale in a corresponding extent in the second region 304. In this manner, the first region 302 and the second region 304 are always aligned with one another.

Referring again to FIGS. 4 and 5, the portion of the trace 320 between points 408 and 410 is not shown in FIG. 5. Of course, if branch 110b was expanded, the screen shown in FIG. 5 would become the screen shown in FIG. 4. That is, expansion along the x-axis of the representation 306 causes an expansion of the same extent in the trace 320. FIGS. 4 and 5 also both include a reference point 412 that illustrates how the trace 320 is contracted/expanded and the representation 306 is expanded or contracted.

It shall be understood that the values displayed in the second region 304 shown in FIGS. 3-5 may be received from actual locations such as, for example, endpoints 106 shown in FIG. 1. Of course, in one embodiment, the values are simulated values. In such an embodiment, simulation results may be displayed as described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for displaying a parameter of a power distribution network, the system comprising:
   a computing device that:
      determines simulation values based at least in part on information received from the power distribution network;
      determines a representation of the parameter from the simulation values; and
   a display coupled to the computing device wherein the display presents:
      a first region depicting a tree branch representation of the power distribution network that can be expanded and collapsed along an axis defining a scale, and wherein the power distribution network comprises:

a feeder and at least one endpoint comprising a measurement device, and
a branch, wherein the branch is a representation of a split in the power distribution network and comprises at least one substation, bulk supply, and power measurement device that measures the representation of the parameter, and
a second region depicting a graphical representation having a linear trace of one or more values of the representation of the parameter that expands along the axis to display a portion of the linear trace corresponding to the branch when the branch is expanded along the axis in the first region and collapses along the axis to hide the portion of the linear trace when the branch is collapsed along the axis in the first region, wherein the expanding and the collapsing of the branch in the first region causes the linear trace in the second region to expand and collapse in a corresponding extent, the first region and the second region being in a fixed relationship relative to one another, and wherein a selected value of the representation of the parameter from the linear trace corresponds to a selected location of the power distribution network, wherein the scale of the axis is the same with respect to the first region and the second region so that the selected location of the power distribution network in the tree branch representation is aligned with the corresponding selected value from a graphical representation of the parameter, and wherein a line perpendicular to the axis is graphically displayed from the selected location from the expandable tree branch structure to the corresponding selected value from the linear trace.

2. The system of claim 1, wherein the representation of the parameter collapses when the tree branch representation of the power distribution network is collapsed.

3. The system of claim 1, wherein the parameter is a voltage.

4. The system of claim 1, wherein the parameter is a power factor.

5. The system of claim 1, further comprising:
the power distribution network.

6. The system of claim 1, wherein the information is received from a simulation program.

7. The system of claim 1, wherein the second region also includes a representation of a second parameter.

8. A method of displaying a representation of a power distribution network and a representation of a parameter of the power distribution network on a display device, the method comprising:
determining simulation values based at least in part on information received from the power distribution network;
determining a representation of the parameter from the simulation values;
displaying the representation of the power distribution network on the display device as an expandable tree branch structure in a first region, the expandable tree branch structure having a branch that can be expanded along an axis defining a scale to create an expanded tree structure and collapsed along the axis to form a collapsed tree structure, wherein the power distribution network comprises:
a feeder and at least one endpoint comprising a measurement device, and a branch, wherein the branch is a representation of a split in the power distribution network and comprises at least one substation, bulk supply, and power measurement device that measures the parameter;
displaying in a second region the representation of the parameter of a power distribution network on the display device during a time period that the representation of the power distribution network is displayed as a linear trace of one or more values of the representation of the parameter, wherein a selected value of the representation of the parameter from the linear trace corresponds to a selected location from the expandable tree branch structure of the power distribution network;
displaying a portion of the linear trace corresponding to the branch along the axis in the second region when the branch is expanded along the axis in the first region; and
collapsing the portion of the linear trace along the axis in the second region when the branch is collapsed along the axis in the first region, wherein:
the expanding and the collapsing of the branch in the first region causes the linear trace in the second region to expand and collapse in a corresponding extent, the first region and the second region being in a fixed relationship relative to one another,
the scale of the axis is the same with respect to the first region and the second region so that the selected location of the power distribution network in the expandable tree branch structure is aligned with the corresponding selected value from the representation of the parameter, and
wherein a line perpendicular to the axis is graphically displayed from the selected location from the expandable tree branch structure to the corresponding selected value from the linear trace.

9. The method of claim 8, wherein collapsing the portion of the representation of the parameter includes collapsing the portion an extent along the axis that equals an extent along the axis that the branch of the tree branch representation of the distribution network collapses when the branch is collapsed.

10. The method of claim 8, wherein the parameter is a power factor.

11. The method of claim 8, wherein the parameter is a voltage.

12. The method of claim 8, further comprising:
receiving values from endpoints of the power distribution network at a computing device creating the representation of the parameter; and
providing the representation of the parameter to the display device.

13. The method of claim 8, further comprising:
receiving values from a simulation of the power distribution network at a computing device;
creating the representation of the parameter from the values; and providing the representation of the parameter to the display device.

14. The method of claim 8, further comprising:
displaying a representation of a different parameter in the second region while the parameter is displayed.

15. A method of displaying a representation of a power distribution network and a representation of a parameter of the power distribution network on a display device, the method comprising:
determining simulation values based at least in part on information received from the power distribution network;

determining a representation of the parameter from the simulation values;

displaying the representation of a power distribution network on the display device as an expandable tree structure in a first region, wherein the power distribution network comprises:
   a feeder and at least one endpoint comprising a measurement device, and the expandable tree structure having a branch, wherein the branch is a representation of a split in the power distribution network and comprises at least one substation, bulk supply, and power measurement device that measures the parameter that can be expanded along an axis to create an expanded tree structure and collapsed along the axis to form a collapsed tree structure;

displaying the representation of the parameter in a second region on the display device during a time period that the representation of the parameter of the power distribution network is displayed as a linear trace of one or more values of the parameter, wherein a selected value of the parameter from the linear trace corresponds to a selected location from the expandable tree branch structure of the power distribution network;

expanding a portion of the linear trace corresponding to the branch along the axis in the second region when the branch is expanded along the axis in the first region; and collapsing the portion of the linear trace along the axis in the second region when the branch is collapsed along the axis in the first region, wherein:
   the expanding and the collapsing of the branch in the first region causes the linear trace in the second region to expand and collapse in a corresponding extent, the first region and the second region being in a fixed relationship relative to one another,
   the scale of the axis is the same with respect to the first region and the second region so that the selected location of the power distribution network in the expandable tree branch structure is aligned with the corresponding selected value from the representation of the parameter, and
   a line perpendicular to the axis is graphically displayed from the selected location from the expandable tree branch structure to the corresponding selected value from the linear trace.

16. The method of claim 15, wherein expanding the portion of the representation of the parameter includes expanding the portion an extent along the axis that equals an extent along the axis that the representation of the distribution network expands when the branch is collapsed.

17. The method of claim 15, wherein the parameter is a power factor.

18. The method of claim 15, wherein the parameter is a voltage.

19. The method of claim 15, further comprising:
receiving values from endpoints of the power distribution network at a computing device;
creating the representation of the parameter; and
providing the representation of the parameter to the display device.

20. The method of claim 15, further comprising:
displaying a representation of a different parameter in the second region while the parameter is displayed.

* * * * *